United States Patent
Harmon et al.

(10) Patent No.: US 11,772,714 B2
(45) Date of Patent: Oct. 3, 2023

(54) EXTENDABLE CARGO BED SIDE WALLS HAVING CARGO BED ACCESS OPENINGS

(71) Applicant: Ford Global Technologies, LLC, Dearborn, MI (US)

(72) Inventors: Michael John Harmon, Northville, MI (US); Ryan Mathew Sandor, North Wales, PA (US); Dragan B. Stojkovic, Taylor, MI (US); Amol Borkar, Nagpur (IN); Christopher Bowser, Dearborn, MI (US); Sarah Schabel, Northville, MI (US); Dale F. Jordan, III, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 17/673,877

(22) Filed: Feb. 17, 2022

(65) Prior Publication Data

US 2023/0257033 A1    Aug. 17, 2023

(51) Int. Cl.
*B62D 33/027* (2006.01)
*B60R 3/00* (2006.01)

(52) U.S. Cl.
CPC ............ *B62D 33/0273* (2013.01); *B60R 3/00* (2013.01); *B62D 33/027* (2013.01)

(58) Field of Classification Search
CPC ............... B62D 33/023; B62D 33/027; B62D 33/0273; B62D 33/03; B60P 3/40; B60R 5/041; B60R 11/06; B60R 3/00
See application file for complete search history.

(56) References Cited

U.S. PATENT DOCUMENTS

| | | | | |
|---|---|---|---|---|
| 4,135,761 A | * | 1/1979 | Ward | B60R 9/02 29/434 |
| 5,518,158 A | * | 5/1996 | Matlack | B62D 33/0273 224/403 |
| 5,669,654 A | * | 9/1997 | Eilers | B60P 1/003 296/26.11 |
| 5,816,637 A | * | 10/1998 | Adams | B60P 3/40 296/57.1 |
| 6,102,474 A | * | 8/2000 | Daley | B60R 11/06 296/76 |

(Continued)

OTHER PUBLICATIONS

Multi-Flex Tailgate, 2021 Chevy Silverado, retrieved from https://www.chevrolet.com/new-roads/trucks/silverado-multi-flex-tailgate on Jan. 18, 2022.

(Continued)

*Primary Examiner* — Gregory A Blankenship
(74) *Attorney, Agent, or Firm* — Vichit Chea; Carlson, Gaskey & Olds, P.C.

(57) ABSTRACT

A cargo bed system includes a side wall assembly of a cargo bed. The side wall assembly is configured to transition back-and-forth between a standard wall position and an extended wall position. The side wall assembly includes an extendable wall section and a fixed side wall section. The extendable wall section extends and retracts relative to the fixed side wall section when the side wall assembly transitions back-and-forth between the standard wall position and the extended wall position. The side wall assembly in the extended wall position provides a cargo bed access opening within the side wall assembly.

20 Claims, 3 Drawing Sheets

(56) References Cited

U.S. PATENT DOCUMENTS

| | | | |
|---|---|---|---|
| 6,367,858 B1* | 4/2002 | Bradford | B60P 3/40 296/26.11 |
| 6,485,077 B1* | 11/2002 | Foster | B62D 33/02 296/183.1 |
| 7,967,356 B2 | 6/2011 | Stackpole | |
| 8,109,552 B2 | 2/2012 | Nelson | |
| 8,534,735 B2* | 9/2013 | McManus | B62D 31/00 296/26.08 |
| 9,387,806 B2 | 7/2016 | Bzoza | |
| 9,481,403 B1* | 11/2016 | Johnson | B62D 33/023 |
| 9,956,995 B1 | 5/2018 | Neighbors et al. | |
| 10,124,836 B2* | 11/2018 | Singer | B62D 33/08 |
| 10,239,567 B1* | 3/2019 | Parrish | B62D 33/08 |
| 11,059,423 B1* | 7/2021 | Weaver | B62D 33/027 |
| 11,247,735 B2* | 2/2022 | Williams | B62D 33/03 |
| 2001/0038218 A1* | 11/2001 | Clare | B60J 10/80 296/187.11 |
| 2003/0141733 A1* | 7/2003 | Burg | B60R 5/041 296/26.09 |
| 2005/0057073 A1* | 3/2005 | Hunt | B62D 33/0273 296/183.1 |
| 2005/0225117 A1* | 10/2005 | Miskech | B62D 33/0273 296/183.1 |
| 2006/0119134 A1* | 6/2006 | Dean | B62D 33/0273 296/182.1 |
| 2009/0284036 A1* | 11/2009 | Clayton | B60P 3/40 296/26.09 |
| 2009/0309380 A1* | 12/2009 | Stackpole | B62D 33/0273 296/26.09 |
| 2011/0156419 A1* | 6/2011 | Takano | B62D 33/0273 296/26.01 |
| 2012/0032465 A1* | 2/2012 | Morita | B62D 33/08 296/26.11 |
| 2012/0079455 A1* | 3/2012 | Phan | G06F 21/32 717/121 |
| 2014/0062128 A1* | 3/2014 | Garchar | B60P 3/40 296/183.1 |
| 2015/0225024 A1 | 8/2015 | Newberry | |
| 2016/0214657 A1* | 7/2016 | Topolovec | B62D 33/0273 |
| 2017/0246980 A1* | 8/2017 | Rodriguez, Jr. | B62D 33/08 |
| 2018/0079455 A1* | 3/2018 | Jaradi | B62D 33/037 |
| 2018/0134205 A1* | 5/2018 | Karumuri | B62D 33/03 |
| 2018/0195332 A1* | 7/2018 | Martins | E05F 5/06 |
| 2019/0217903 A1* | 7/2019 | Marimon De La Morena | B60J 5/0498 |
| 2020/0114826 A1* | 4/2020 | Stojkovic | H01M 10/6568 |
| 2021/0188368 A1* | 6/2021 | Williams | B60P 3/40 |
| 2021/0229606 A1* | 7/2021 | Zitting | B60R 11/06 |
| 2021/0253180 A1* | 8/2021 | Selle | B62D 33/0273 |
| 2022/0119045 A1* | 4/2022 | Horner | B62D 33/027 |
| 2022/0289312 A1* | 9/2022 | Aquila | B60R 5/02 |
| 2023/0024934 A1* | 1/2023 | Bernal | B62D 33/027 |

OTHER PUBLICATIONS

Canoo, Pickup Truck, retrieved from https://www.canoo.com/pickup/ on Jan. 18, 2022.

* cited by examiner

EXTENDABLE CARGO BED SIDE WALLS HAVING CARGO BED ACCESS OPENINGS

TECHNICAL FIELD

This disclosure relates generally to a cargo bed of a vehicle and, more particularly, to a cargo bed having side walls that can be extended to provide a cargo bed access opening.

BACKGROUND

Some vehicles, such as pickup trucks, include a cargo bed. Users utilize cargo beds to carry various types of cargo. The cargo bed can be located behind a passenger compartment of the vehicle. A tailgate can enclose an aft end of the cargo bed.

SUMMARY

In some aspects, the techniques described herein relate to a cargo bed system, including: a side wall assembly of a cargo bed, the side wall assembly configured to transition back-and-forth between a standard wall position and an extended wall position, the side wall assembly including an extendable wall section and a fixed side wall section, the extendable wall section extending and retracting relative to the fixed side wall section when the side wall assembly transitions back-and-forth between the standard wall position and the extended wall position, the side wall assembly in the extended wall position providing a cargo bed access opening within the side wall assembly.

In some aspects, the techniques described herein relate to a cargo bed system, wherein the cargo bed access opening opens vertically upwards.

In some aspects, the techniques described herein relate to a cargo bed system, wherein a front wall of the cargo bed provides a front side of the cargo bed access opening.

In some aspects, the techniques described herein relate to a cargo bed system, wherein an upper side wall of the extendable wall section provides a rear side of the cargo bed access opening.

In some aspects, the techniques described herein relate to a cargo bed system, wherein the extendable wall section includes a cargo holding surface.

In some aspects, the techniques described herein relate to a cargo bed system, wherein cargo coupled to the cargo holding surface is received within the fixed side wall section when the side wall assembly is in the standard wall position.

In some aspects, the techniques described herein relate to a cargo bed system, further including a taillight of the extendable wall section, the taillight extending and retracting with the extendable wall section relative to the fixed side wall section.

In some aspects, the techniques described herein relate to a cargo bed system, wherein the extendable wall section is telescopically received within the fixed side wall section when the side wall assembly is in the standard wall position.

In some aspects, the techniques described herein relate to a cargo bed system, further including a grab handle that can be actuated to release the extendable wall section such that the extendable wall section can extend relative to the fixed side wall section of the side wall assembly.

In some aspects, the techniques described herein relate to a cargo bed system, wherein the side wall assembly is first side wall assembly on a driver side, and further including a second side wall assembly on a passenger side that is configured to transition back-and-forth between a standard wall position and an extended wall position.

In some aspects, the techniques described herein relate to a cargo bed system, further including a floor assembly configured to transition back-and-forth between a standard floor position and an extended floor position.

In some aspects, the techniques described herein relate to a cargo bed system, wherein the cargo bed is configured to transition back-and-forth between an extended bed position and a standard bed position, the cargo bed having an extended area when in the extended bed position, wherein the extendable wall section is configured to, when extended, provide a side wall of the extended area.

In some aspects, the techniques described herein relate to a cargo bed system, further including a tailgate assembly having an inner side that faces a front wall of the cargo bed when the tailgate assembly is in a closed position, the tailgate assembly configured to pivot from the closed position, past a first open position where the inner side is oriented horizontally and aligned with a floor of the cargo bed, to a second open position where the inner side is angled downward from the floor of the cargo bed.

In some aspects, the techniques described herein relate to a cargo bed system, further including a step within the inner side of the tailgate assembly.

In some aspects, the techniques described herein relate to a cargo bed adjustment method, including: transitioning a side wall assembly of a cargo bed from a standard wall position to an extended wall position by extending an extendable wall section of the side wall assembly relative to a fixed side wall section of the side wall assembly; and providing a cargo bed access opening within the side wall assembly during the transitioning.

In some aspects, the techniques described herein relate to a cargo bed adjustment method, wherein the extendable wall section includes a taillight such that the taillight extends and retracts with the extendable wall section of the side wall assembly.

In some aspects, the techniques described herein relate to a cargo bed adjustment method, further including operating the taillight when the side wall assembly is in the extended wall position.

In some aspects, the techniques described herein relate to a cargo bed adjustment method, further including extending the extendable wall section to provide access to a storage area within the side wall assembly when the side wall assembly is in the standard wall position.

In some aspects, the techniques described herein relate to a cargo bed adjustment method, further including pivoting a tailgate from a closed position to a first open position where an inner side of the tailgate is oriented horizontally and aligned with a floor of the cargo bed to a second open position where the inner side is angled downward from the floor of the cargo bed.

In some aspects, the techniques described herein relate to a cargo bed adjustment method, further including providing a step within the inner side of the tailgate.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a cargo bed for a vehicle. The cargo bed can transition back-and-forth between a standard bed position and an extended bed position. The cargo bed in the extended bed position provides cargo bed access openings in a least one side wall of the cargo bed. A user can utilize the cargo bed access openings to access cargo stored at a front of the cargo bed, for example.

Figure 1:
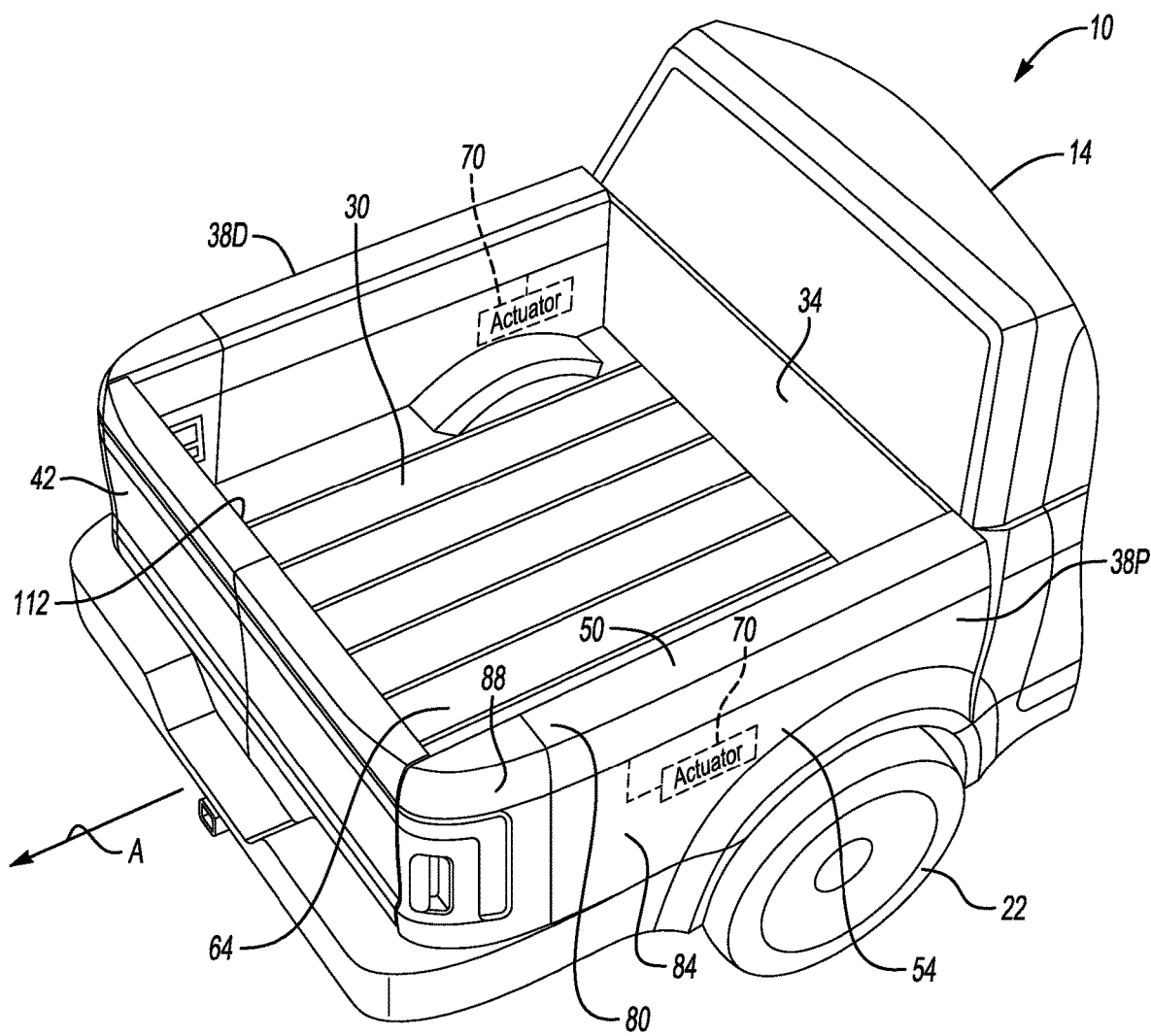
FIG. 1 illustrates a vehicle having a cargo bed with the cargo bed in a standard bed position.

With reference to FIG. 1, a vehicle 10 includes a passenger compartment 14 and a cargo bed 18 that is aft the passenger compartment 14 along a longitudinal axis A of the vehicle 10.

In the exemplary embodiment, the vehicle 10 is a pickup truck. The vehicle 10 could be another type of vehicle in another example, such as a car, van, sport utility vehicle, etc. The vehicle 10 has a unibody architecture. In another embodiment, the vehicle 10 could have a body-on-frame architecture.

The example vehicle 10 is an electrified vehicle. In particular, the vehicle 10 is a battery electric vehicle. In another example, the vehicle 10 could be another type of electrified vehicle, such as a plug-in hybrid electric vehicle (PHEV), or a conventional vehicle.

The example vehicle 10 includes an electrified powertrain capable of applying a torque from an electric machine (e.g., an electric motor) to drive a pair of wheels 22. The vehicle 10 can include a traction battery pack, which powers the electric machine and, potentially, other electrical loads of the vehicle 10. The powertrain of the vehicle 10 may electrically propel the wheels 22 either with or without the assistance of an internal combustion engine.

FIG. 1 shows the cargo bed 18 in a standard bed position. The cargo bed 18 can be transitioned from the standard bed position of FIG. 1 to the extended bed position of FIG. 2. The cargo bed 18 includes an extended area 20 when in the extended bed position. In the extended bed position, the cargo bed 18 can transport more cargo or larger cargo.

Figure 2:
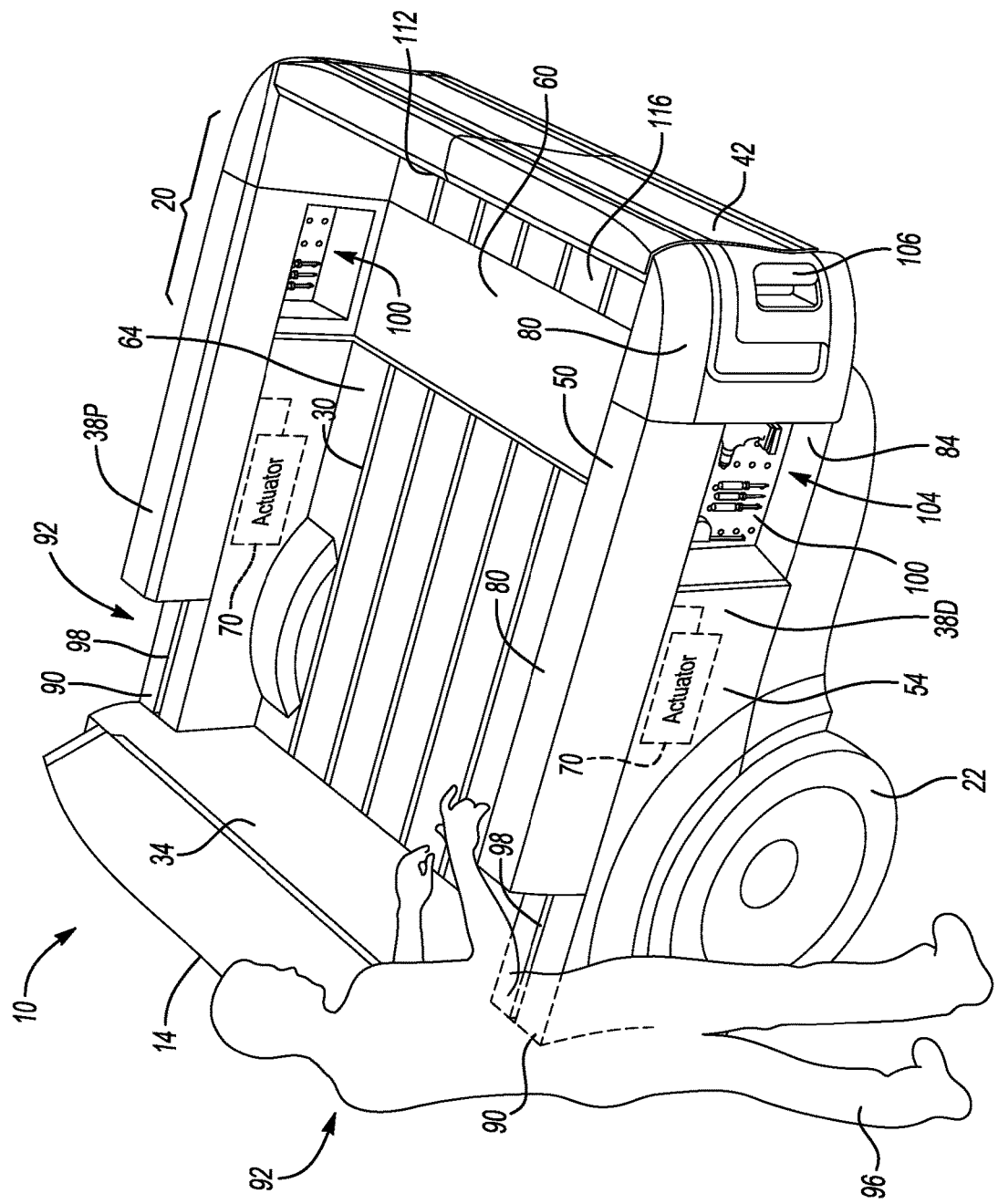
FIG. 2 illustrates the vehicle of FIG. 1 with the cargo bed in an extended bed position.

The cargo bed 18 includes a floor assembly 30, a front wall 34, a first side wall assembly 38D, a second side wall assembly 38P, and a tailgate assembly 42. The first side wall assembly 38D and the second side wall assembly 38P are each configured to transition back-and-forth between a standard wall position as shown in FIG. 1 and an extended wall position as shown in FIG. 2. The first side wall assembly 38D and the second side wall assembly 38P are parts of a cargo bed system that enables the cargo bed 18 to be transitioned back-and-forth between the standard bed position of FIG. 1 and the extended bed position of FIG. 2.

In this example, the first side wall assembly 38D and the second side wall assembly 38P each include an extendable wall section 50 and a fixed side wall section 54. The extendable wall sections 50 can extend and retract relative to the respective fixed side wall sections 54. The extendable wall sections 50 are retracted when the cargo bed 18 is in the standard bed position. The extendable wall sections 50 are extended when the cargo bed 18 is in the extended bed position.

The floor assembly 30 includes an extendable floor portion 60 and a fixed floor portion 64. The extendable floor portion 60 can extend and retract to transition the floor assembly 30 back-and-forth between a standard floor position and an extended floor position. The floor assembly 30 is in the standard floor position with the extendable floor portion 60 retracted when the cargo bed 18 is in the standard bed position. The floor assembly 30 is in the extended floor position with the extendable floor portion 60 extended when the cargo bed 18 is in the extended bed position.

In the exemplary embodiment, the cargo bed 18 relies on one or more actuators 70 to move the cargo bed 18 back-and-forth between the standard bed position and the extended bed position. The actuators 70 could be screw-driven linear actuators, for example. The actuators 70 could extend and retract in response to command from a button on the vehicle 10 or an input from a handheld device, such as a smartphone. In another example, the user manually moves the cargo bed 18 back-and-forth between the standard bed position and the extended bed position by sliding the cargo bed 18.

In the exemplary embodiment, the actuators 70 extend to extend the extendable wall sections 50. The extendable floor portion 60 is directly connected to the extendable wall sections 50 and is thus pulled by the extendable wall sections 50 to extend the extendable floor portion 60.

The extendable wall sections 50 each include an upper side wall 80, a core section 84, and a taillight 88. The upper side wall 80 extends along an upper edge 90 of the fixed side wall section 54 from the taillight 88 to the front wall 34.

Extending the extendable wall sections 50 moves the upper side wall 80 away from the front wall 34 to provide cargo bed access openings 92 within the first and second side wall assemblies 38D, 38P. A user 96 can access the cargo bed 18 using the cargo bed access openings 92. The user 96 can use the cargo bed access openings 92 to load cargo into to a forward area of the cargo bed 18 without climbing into the cargo bed 18, for example.

Each example cargo bed access opening 92 open vertically upwards. The front wall 34 provides a front side of the cargo bed access opening 92, the upper side wall 80 provides a rear side, and the fixed side wall section 54 provides a bottom side. In other examples, the cargo bed access openings 92 could be located further rearward and spaced from the front wall 34. For example the fixed side wall section 54 could including a portion that extends vertically upward in front of the wheels. The upper side walls 80 are shorter than what is shown in the figures. Extending the extendable wall sections 50 still reveals a cargo bed access opening, but that opening is further rearward and aft of the portion that extends vertically upward in front of the wheels 22. This cargo bed access opening could be located near the leader line associated with reference number 80 in FIG. 2.

The upper side wall 80 is slidable coupled to the fixed side wall section 54. The upper side wall 80 can include a rail that is received within a groove 98 of the fixed side wall section 54, for example.

The core section 84 is the portion of the extendable wall section 50 that is received within the fixed side wall section 54 when the first and second side wall assemblies 38D, 38P are in the standard wall position. In this example, the core sections 84 of the extendable wall sections 50 are telescopically received within the respective fixed side wall sections 54. The core section 84 can include a cargo holding surface 100. Side wall cargo 104, such as tools and other accessories, can be coupled to the cargo holding surface 100. The side wall cargo 104 could rest on the cargo holding surface 100 or could hang from the cargo holding surface 100.

When the extendable wall sections 50 are extended, the side wall cargo 104 can be accessed. When the extendable wall sections 50 are extended, a cover could be used to conceal and secure the side wall cargo 104. Instead or additionally, the side wall cargo could couple to a cargo holding surface that faces into the cargo bed 18. A tonneau cover could then cover the cargo bed 18 to secure that side wall cargo 104. When the extendable wall sections 50 are retracted, the side wall cargo 104 are received within the respective fixed side wall section 54, which secures and protects the side wall cargo 104.

The example first side wall assembly 38D and second side wall assembly 38P thus include storage areas that can be accessed by extending the respective extendable wall section 50. The extendable wall sections 50 could be locked when retracted to prevent unauthorized access to the side wall cargo 104 that is coupled to the cargo holding surface 100.

The taillight 88 is part of the extendable wall section 50. The taillight 88 extends and retracts with the extendable wall section 50. The taillight 88 is operational when the extendable wall section 50 is extended. Thus, there may be no need to add additional lighting when operating the vehicle 10 with extendable wall section 50 extended as shown in FIG. 2 and the cargo bed 18 in the extended bed position. Sensors could also be included within the extendable wall section 50. The sensors could operable with the extendable wall section 50 extended and retracted.

In the exemplary embodiment, the first side wall assembly 38D includes a grab handle 106 that can be actuated to release the extendable wall section 50 of the first side wall assembly 38D so that the extendable wall section 50 of the first side wall assembly 38D can extend relative to the fixed side wall section 54. Another grab handle can additionally or instead be included within the extendable wall section 50 of the second side wall assembly 38P.

Figure 3:
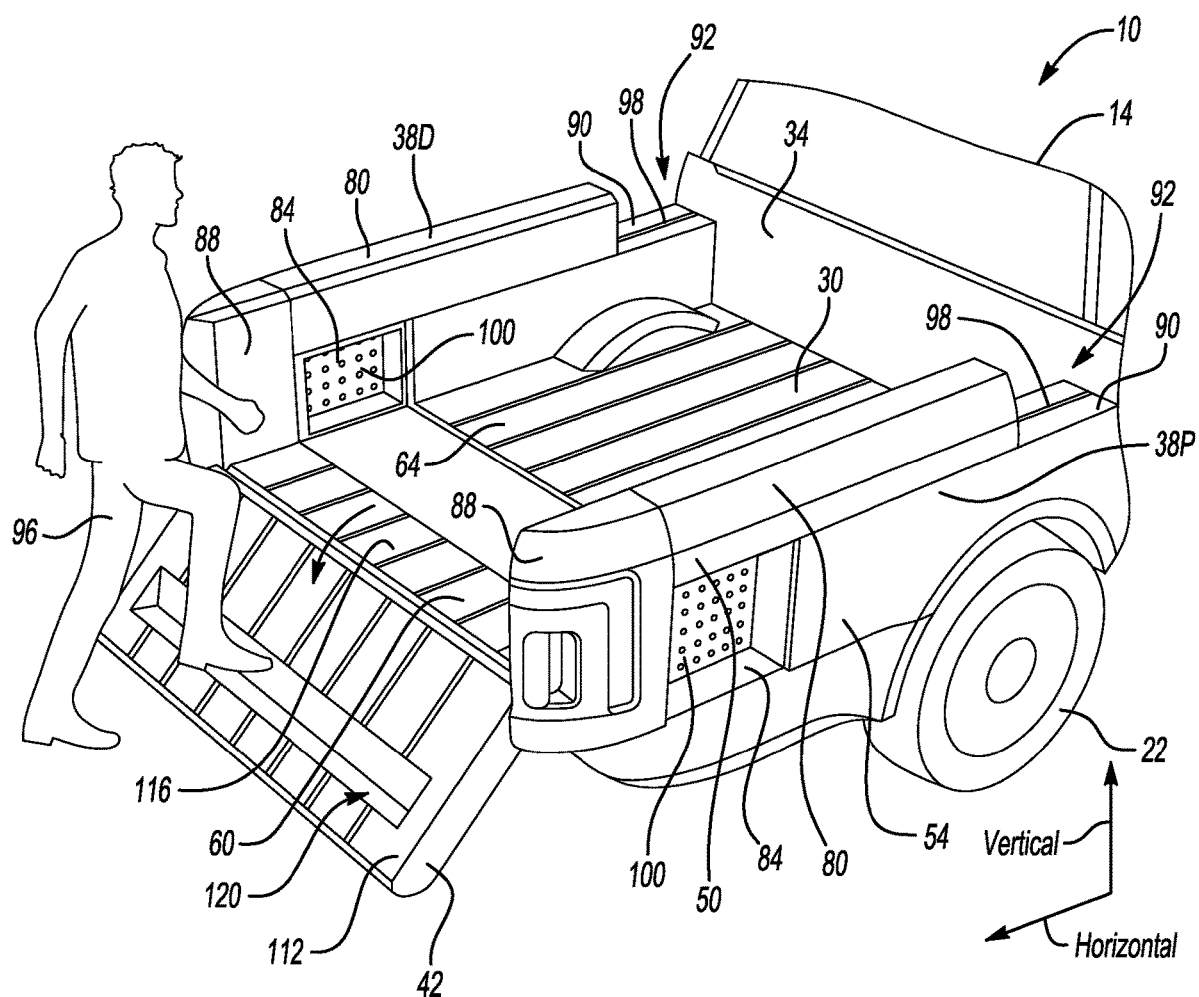
FIG. 3 illustrates the vehicle of FIG. 1 with a tailgate of the cargo bed in an open position and providing a step.

In this example, the tailgate assembly 42 can pivot from the closed position of FIGS. 1 and 2 to the open position of FIG. 3. The tailgate assembly 42 has an inner side 112 that faces the front wall 34 of the cargo bed 18 when the tailgate assembly 42 is in the closed position of FIGS. 1 and 2. The tailgate assembly 42 is configured to pivot from the closed position of FIGS. 1 and 2, past an open position where the inner side 112 is oriented horizontally and aligned with a floor 116 of the cargo bed 18, to the open position shown in FIG. 3 where the inner side 112 is angled downward from the floor 116 of the cargo bed 18. In some examples, the tailgate assembly 42 contacts ground when in the position of FIG. 3. Vertical and horizontal, for purposes of this disclosure, are with reference to ground and a general orientation of the vehicle 10 during ordinary operation.

The tailgate assembly 42 includes a step 120 within the inner side 112. The user can use the step to assist when entering the cargo bed 18. The step 120 can be a recessed area within the inner side.

An adjustment method for the cargo bed 18 can include transitioning a side wall assembly 38D of a cargo bed 18 from a standard wall position to an extended wall position by extending an extendable wall section 50 of the side wall assembly 38D relative to a fixed side wall section 54 of the side wall assembly 38D. Extending the extendable wall section 50 can move the cargo bed 18 to an extended bed position. Extending the extendable wall section 50 can also provide a cargo bed access opening 92 in the side wall assembly 38 that the user 96 can use to access cargo within the cargo bed 18.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A cargo bed system, comprising:
a side wall assembly of a cargo bed, the side wall assembly configured to transition back-and-forth in a longitudinal direction of the cargo bed between a standard wall position and an extended wall position, the side wall assembly including an extendable wall section and a fixed side wall section, the extendable wall section having an upper side wall that is disposed vertically above the fixed wall section, the extendable wall section extending and retracting relative to the fixed side wall section when the side wall assembly transitions back-and-forth between the standard wall position and the extended wall position, the side wall assembly in the extended wall position providing a cargo bed access opening within the side wall assembly.

2. The cargo bed system of claim 1, wherein the cargo bed access opening opens vertically upwards.

3. The cargo bed system of claim 1, wherein a front wall of the cargo bed provides a front side of the cargo bed access opening.

4. The cargo bed system of claim 1, wherein the extendable wall section includes a cargo holding surface.

5. The cargo bed system of claim 4, wherein cargo coupled to the cargo holding surface is received within the fixed side wall section when the side wall assembly is in the standard wall position.

6. The cargo bed system of claim 1, further comprising a taillight of the extendable wall section, the taillight extending and retracting with the extendable wall section relative to the fixed side wall section.

7. The cargo bed system of claim 1, wherein the extendable wall section is telescopically received within the fixed side wall section when the side wall assembly is in the standard wall position.

8. The cargo bed system of claim 1, further comprising a grab handle that can be actuated to release the extendable wall section such that the extendable wall section can extend relative to the fixed side wall section of the side wall assembly.

9. The cargo bed system of claim 1, wherein the side wall assembly is first side wall assembly on a driver side, and further comprising a second side wall assembly on a passenger side that is configured to transition back-and-forth between a standard wall position and an extended wall position.

10. The cargo bed system of claim 7, further comprising a floor assembly configured to transition back-and-forth between a standard floor position and an extended floor position.

11. The cargo bed system of claim 1, wherein the cargo bed is configured to transition back-and-forth between an extended bed position and a standard bed position, the cargo bed having an extended area when in the extended bed position, wherein the extendable wall section is configured to, when extended, provide a side wall of the extended area.

12. The cargo bed system of claim 1, further comprising a tailgate assembly having an inner side that faces a front wall of the cargo bed when the tailgate assembly is in a closed position, the tailgate assembly configured to pivot from the closed position, past a first open position where the inner side is oriented horizontally and aligned with a floor of the cargo bed, to a second open position where the inner side is angled downward from the floor of the cargo bed.

13. The cargo bed system of claim 12, further comprising a step within the inner side of the tailgate assembly.

14. The cargo bed system of claim 1, wherein the upper side wall of the extendable wall section provides a rear side of the cargo bed access opening.

15. A cargo bed system, comprising:
a side wall assembly of a cargo bed, the side wall assembly configured to transition back-and-forth between a standard wall position and an extended wall position, the side wall assembly including an extendable wall section and a fixed side wall section, the extendable wall section extending and retracting relative to the fixed side wall section when the side wall assembly transitions back-and-forth between the standard wall position and the extended wall position, the side wall assembly in the extended wall position providing a cargo bed access opening within the side wall assembly,
wherein a front wall of the cargo bed provides a front side of the cargo bed access opening,
wherein an upper side wall of the extendable wall section provides a rear side of the cargo bed access opening.

16. A cargo bed adjustment method, comprising:
transitioning a side wall assembly of a cargo bed from a standard wall position to an extended wall position by extending an extendable wall section of the side wall assembly relative to a fixed side wall section of the side wall assembly; and
providing a cargo bed access opening within the side wall assembly during the transitioning, wherein an upper side wall of the extendable wall section provides a rear side of the cargo bed access opening.

17. The cargo bed adjustment method of claim 16, wherein the extendable wall section includes a taillight such that the taillight extends and retracts with the extendable wall section of the side wall assembly.

18. The cargo bed adjustment method of claim 17, further comprising operating the taillight when the side wall assembly is in the extended wall position.

19. The cargo bed adjustment method of claim 16, further comprising extending the extendable wall section to provide access to a storage area within the extendable wall section, the storage area housed within the fixed side wall section when the side wall assembly is in the standard wall position.

20. The cargo bed adjustment method of claim 16, wherein the extendable wall section has an upper side wall that is disposed vertically above the fixed wall section.

* * * * *